United States Patent [19]

Gröger

[11] Patent Number: 4,625,943

[45] Date of Patent: Dec. 2, 1986

[54] PIVOTAL CLOSING MEMBER

[75] Inventor: Klaus Gröger, Hemmignen, Fed. Rep. of Germany

[73] Assignee: Dr. Ing. H.c.F. Porsche Aktiengesellschaft, Stuttgart, Fed. Rep. of Germany

[21] Appl. No.: 668,217

[22] Filed: Nov. 5, 1984

[30] Foreign Application Priority Data

Nov. 5, 1983 [DE] Fed. Rep. of Germany ... 3340127[U]

[51] Int. Cl.[4] .................................... F16K 11/052

[52] U.S. Cl. .................................... 251/305; 251/337; 267/155

[58] Field of Search .................... 251/305, 313, 337; 267/58, 155

[56] References Cited

U.S. PATENT DOCUMENTS

| | | | |
|---|---|---|---|
| Re. 22,030 | 2/1942 | Boller | 251/313 X |
| 2,815,916 | 12/1957 | Holmes et al. | 251/305 X |
| 3,395,727 | 8/1968 | Weise et al. | 251/305 X |
| 3,606,980 | 9/1971 | Simpson | 251/305 X |
| 3,996,961 | 12/1976 | Siegwart | 251/337 X |
| 4,285,676 | 8/1981 | Kraft | 267/155 X |
| 4,301,823 | 11/1981 | Meisenheimer, Jr. | 251/313 X |

*Primary Examiner*—Harold W. Weakley
*Assistant Examiner*—John C. Fox
*Attorney, Agent, or Firm*—Barnes & Thornburg

[57] ABSTRACT

A throttle valve for regulating the introduction of a fuel-air mixture into an internal-combustion engine is provided with a return spring system. The return spring system includes a first coiled spring, a second coiled spring, a hat-shaped bushing for separating the two spring coils and a lever, fixed in relation to a throttle valve housing, for simultaneously loading both spring coils to yieldably urge the throttle valve toward a normal position. The return spring system is positioned at one end of a shaft on which the throttle valve is mounted and operates to yieldably rotate the shaft in a selected direction to orient the throttle valve.

2 Claims, 3 Drawing Figures

PIVOTAL CLOSING MEMBER

BACKGROUND AND SUMMARY OF THE INVENTION

This invention relates to a pivotal closing member, and particularly to a throttle valve for the control of the feeding of the fuel-air mixture of an internal-combustion engine. More particularly, the present invention relates to a throttle valve that is fastened to a shaft rotatably mounted in a housing and that is yieldably urged toward a selected end position by means of a pull-back spring system.

It is known to provide a carburator for internal-combustion engines wherein the carburator includes a throttle valve held in a closed end position by means of a tension spring. (Journal *Revue Technique Automobile,* June 1982, No. 423, Page 12).

One object of the present invention is to provide a return spring system for a throttle valve that is secure and easy to assemble. Another object of the present invention is to provide a return spring system for a throttle valve that is compact and reliable.

According to the present invention, a return spring system includes a first coiled spring, a second coiled spring having a diameter greater than the diameter of the first coiled spring, a hat-shaped bushing for separating the two coiled springs and a lever for simultaneously loading both coiled springs. The spring system is positioned at one end of a throttle valve-carrying shaft and operates to yieldably rotate the shaft in a selected direction to orient the throttle valve.

One feature of the present invention is the provision of two coiled springs also referred to as leg springs. If one leg spring fails or is otherwise inoperative, the other leg spring will operate to bias the throttle valve. Thus, the present invention reliably and advantageously prevents an internal-combustion engine from operating in an uncontrolled manner over an undesirable speed range. Also, both leg springs are compact and require little space. Moreover, assembly of the two leg springs and the bushing separating them is very simple. Use of the lever to prestress or load these leg springs is easily accomplished due to their particular arrangement and interaction with the lever.

Further objects, features, and advantages of the present invention will become more apparent from the following description when taken with the accompanying drawings which show, for purpose of illustration only, an embodiment in accordance with the present invention.

DETAILED DESCRIPTION OF THE DRAWINGS

Figure 3:
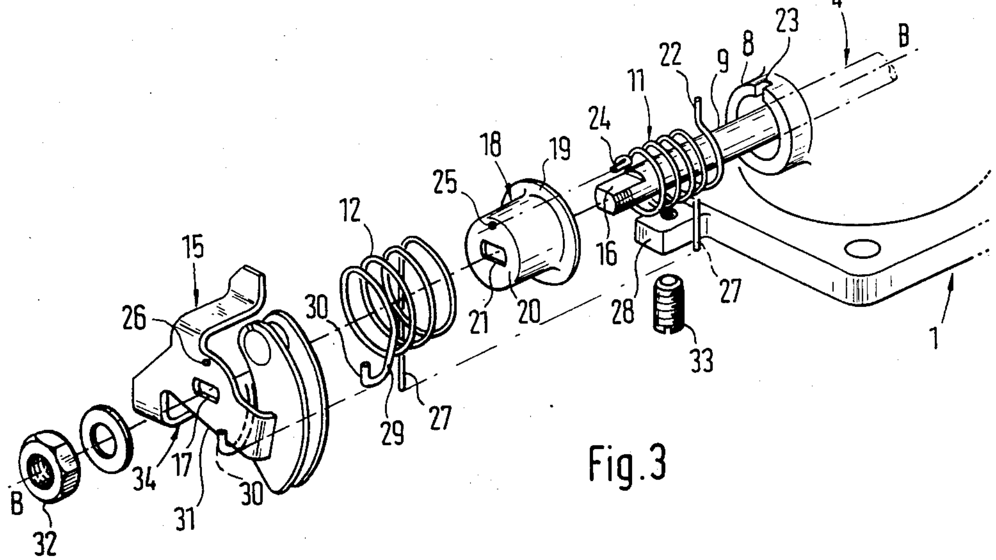
FIG. 3 is an exploded assembly view of the invention illustrated in FIG. 1.

A housing 1 is formed to include a flow-through duct 2 for receiving a fuel-air mixture used in an internal-combustion engine (not shown). A throttle valve 3 is attached to a shaft 4 and positioned in the flow-through duct 2. The shaft 4 interacts with bearings 5,6 which are mounted in bearing lugs 7,8 of the housing 1. One end 9 of the shaft 4 projects beyond the housing 1 to receive a return spring system 10. The return spring system 10 has two leg springs 11, 12 including, respectively, coils 13, 14 having different diameters B and C. The two leg springs 11, 12 are located, one around or about the other, to surround the one end 9, of shaft 4. The leg springs 11 and 12 are each supported at the housing 1 and at a lever 15. The lever 15 is carried by the one end 9 of the shaft 4 in a rotatably stable manner. For this purpose, a flat 16 is provided at the one end 9 for interaction with a corresponding opening 17 formed in lever 15 as shown best in FIG. 3.

A hat-shaped bushing 18 is positioned to lie intermediate the radially inner leg spring 11 and the radially outer leg spring 12 and includes an edge 19 which faces the housing 1 and engages the radially outer leg spring 12. The edge 19 is positioned in close proximity to the bearing lug 8. The opposing end of the bushing 18 is provided with a supporting wall 20 which rests against the lever 15 and is formed to include an opening 21. The shape of the opening 21 corresponds to the profile of flat 16 of the shaft end 9. Thus, bushing 18 is also connected to the one end 9 of shaft 4 in a rotatably stable manner.

The radially inner spring 11, includes a leg 22 that is positioned to face the housing 1 and that is inserted into a recess 23 of the bearing lug 8 of the housing 1. The spring 11 includes a second leg 24 positioned to extend toward the lever 15. The leg 24 is bent as shown best in FIG. 3 to extend in longitudinal direction B—B of the shaft 4 and is introduced into openings 25, 26 of the bushing 18 and of the lever 15.

The radially outer spring 12 includes a leg 27 that is positioned to face the housing 1 and rest against a limit stop 28 of the housing 1. Spring 12 includes an opposite leg 29 which is also positioned to extend toward the lever 15. The leg 29 is formed to include a bend 30 which reaches around an edge 31 of the lever 15.

Figure 1:
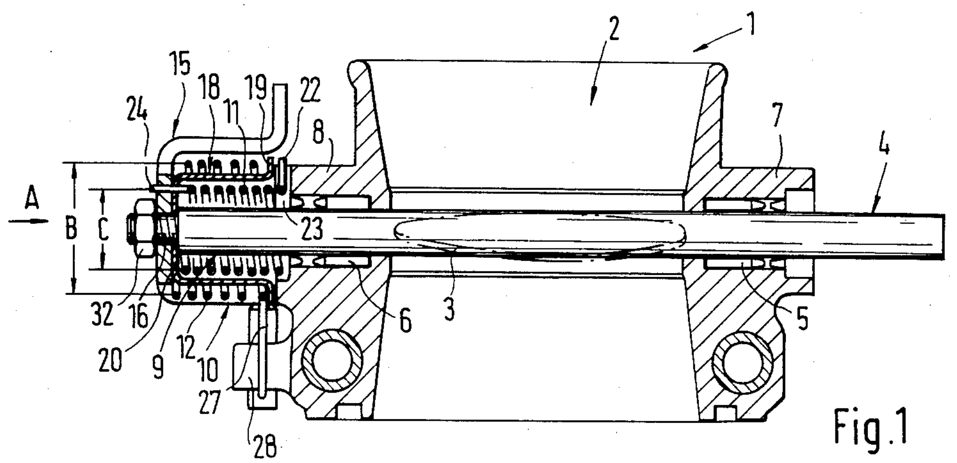
FIG. 1 is a sectional elevation view of a preferred embodiment of the present invention showing a throttle valve carried on a spring-loaded shaft.
Figure 2:
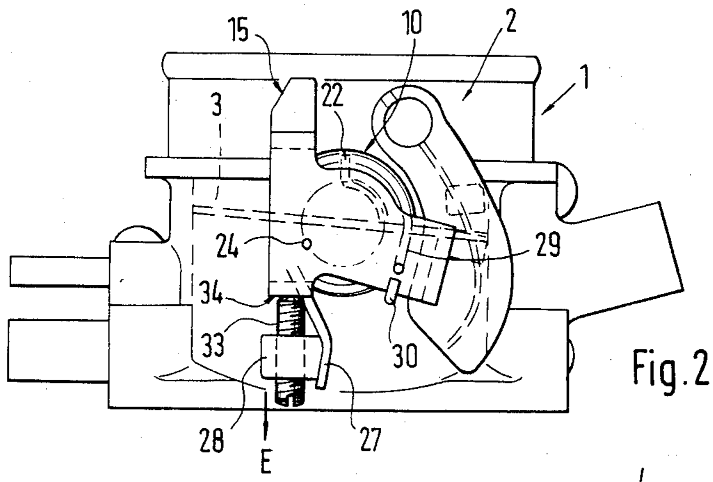
FIG. 2 is a view of the invention illustrated in FIG. 1 taken in the direction of Arrow A.

During the assembly of the return spring system 10, the components are mounted on end 9 of shaft 4 from left to right and are secured axially by means of a nut 32 as shown in FIG. 1. Subsequently, the lever 15 is swivelled or otherwise moved into the position shown in FIG. 2 to simultaneously prestress and load both leg springs 11 and 12. A supporting member 33 formed by a threaded screw holds the lever 15 in this position. The supporting member 33 threadedly engages limit stop 28 and interacts with a stop surface 34 of the lever 15. The supporting member 33 is moved in direction E shown in FIG. 2 into a position such that the lever 15 with its stop surface 34 can be led past it before the prestressing of the leg springs 11 and 12.

Although the invention has been described in detail with reference to certain preferred embodiments and specific examples, variations and modifications exist within the scope and spirit of the invention as described and defined in the following claims.

What is claimed is:

1. A return spring system for a throttle valve comprising:
   - a housing;
   - a shaft rotatably mounted in said housing;
   - a valve attached to said shaft;
   - a lever attached to said shaft;
   - a multiplicity of spring members having coils of different diameters and being concentrically arranged, each of said spring members having a first end attached to said lever and a second end attached to said housing, said spring members include an outer spring member concentrically disposed around an inner spring member; wherein the lever includes an opening for receiving said first end of the inner spring member and the housing includes a recess for receiving said second end of the inner spring member, and the housing includes a stop member for engaging said second end of said outer spring; and said outer spring first end includes a bent portion engaging an edge of said lever, all of said spring members urging said shaft in a uniform direction;

a bushing attached to said shaft disposed intermediate said outer spring member and said inner spring member, said bushing having an opening for receiving said first end of said inner spring;

a loading means including said lever for loading said inner and outer spring members for urging said shaft in a uniform direction; and a retaining means for retaining the lever in a first position, said retaining means including a screw member in threaded engagement with the stop member of the housing, the screw member being movable to engage the lever.

2. An apparatus according to claim 1, wherein said bushing has an outwardly extending annular edge portion on a second end and an inwardly extending supporting wall on a first end, said outwardly extending edge portion engaging a second end coil of said outer spring and said inwardly extending supporting wall engaging a first end coil of said inner spring.

* * * * *